United States Patent [19]

Tsunoda et al.

[11] Patent Number: 5,109,374
[45] Date of Patent: Apr. 28, 1992

[54] SMALL-SIZED OPTICAL MEMORY DEVICE AND INFORMATION PROCESSING APPARATUS UTILIZING CYLINDRICALLY SHAPED INFORMATION RECORDING MEDIUM

[75] Inventors: Yoshito Tsunoda, Tokyo; Hiroshi Yasuoka, Fujisawa; Takeshi Maeda, Kokubunji, all of Japan

[73] Assignee: Hitachi, Ltd., Tokyo, Japan

[21] Appl. No.: 406,519

[22] Filed: Sep. 13, 1989

[30] Foreign Application Priority Data

Sep. 19, 1988 [JP] Japan .................... 63-232366

[51] Int. Cl.$^5$ .............................. G11B 7/00
[52] U.S. Cl. ...................... 369/100; 346/138; 346/160
[58] Field of Search .......... 369/13, 44.11, 44.14, 369/112, 100, 109, 32, 111; 346/76 L, 138, 160, 108; 358/490, 489, 474, 296; 365/106

[56] References Cited

U.S. PATENT DOCUMENTS 3,636,529 1/1972 Borner et al. .
3,654,624 4/1972 Becker et al. .................. 365/127
4,829,503 5/1989 Petrov et al. ................ 369/100 X

FOREIGN PATENT DOCUMENTS 0237682 9/1987 European Pat. Off. .
0325838 8/1989 European Pat. Off. .
8804818 6/1988 U.S.S.R. .
2151066 7/1985 United Kingdom .

Primary Examiner—Robert L. Richardson
Attorney, Agent, or Firm—Antonelli, Terry Stout & Kraus

[57] ABSTRACT

An optical memory device includes a cylindrically-shaped optical information recording medium and at least one optical head disposed around the information recording medium for irradiating the information recording medium with a light spot for recording or reproduction of information. The optical head has light spot moving means incorporated therein for the irradiation position of the light spot. The recording or reproduction of information is achieved by causing the light spot moving means to perform tracking control so that the light spot follows a desired track in an area within a range of movement of the light spot by the light spot moving means (or an infromation recording zone) in a state in which the relative positional relationship between the optical head and the cylindrically-shaped information recording medium in the direction parallel to the direction of the rotation axis of the information recording medium is fixed, with the optical head being not moved. The device can be constructed so that the position of either the optical head or the cylindrically-shaped information recording medium relative to the other in the direction parallel to the direction of the rotation axis of the information recording medium is mechanically moved, thereby making it possible to cahnge the information recording zone in the range of movement of the light spot by the light spot moving means to another information recording zone.

21 Claims, 4 Drawing Sheets

SMALL-SIZED OPTICAL MEMORY DEVICE AND INFORMATION PROCESSING APPARATUS UTILIZING CYLINDRICALLY SHAPED INFORMATION RECORDING MEDIUM

BACKGROUND OF THE INVENTION

The present invention relates to a small-sized and high-performance optical memory device suitable for use in a small-sized computer such as a portable computer. More particularly, the present invention relates to a small-sized optical memory device the access speed and data transfer rate of which are faster than those of the conventional magnetic memory.

File memories previously used for a small-sized portable computer such as a laptop computer include a fixed magnetic disk, a floppy disk, etc. However, these file memory devices present a great problem pertaining to the performance thereof. A first problem is concerned with the fact that the distance between the magnetic head and the recording medium is very small in the case of the magnetic memory. More particularly, when the magnetic memory device is used in a strongly vibrational condition as in a portable computer, the destruction of data may be caused by the recording medium touching the magnetic head or the like, thereby deteriorating the reliability. A second problem is that the demand for a increase in memory capacity will result in an increase in the size of the memory device and hence an increase in the size of the file apparatus. A third problem is that it is very difficult to significantly shorten the access time. This is because in the case of the magnetic memory the magnetic head must be mechanically moved by large strokes.

SUMMARY OF THE INVENTION

An object of the present invention is to solve the above-mentioned problems of conventional memory devices and to provide a small-sized and high-performance optical memory device which enables fast access and fast data transfer.

Another object of the present invention is to provide a high-reliability optical memory device which has excellent resistance against vibration and can provide very stable ,operation even under a strongly vibrational condition of use as encountered in a portable computer or the like.

A further object of the present invention is to provide an information processing apparatus such as a laptop computer or a portable computer into which the above-mentioned inventive optical memory device can be incorporated as a package.

An optical memory device according to the present invention comprises a cylindrically-shaped rotating optical information recording medium and at least one optical head provided around the information recording medium for irradiating the information recording medium with a light spot for recording or reproduction of information, the optical head having light spot moving means incorporated therein for controlling the irradiation position of the light spot, the recording or reproduction of information being made by causing the light spot moving means to perform a tracking control so that the light spot follows a desired track, in an area within a range of movement of the light spot, by the optical spot moving means (or an information recording zone) in a state in which a relative positional relationship between the optical head and the cylindrically-shaped information recording medium in a direction parallel to the direction of a rotation axis of the information recording medium is fixed with the optical head itself being not moved.

As the light spot moving means there can be used a lens actuator for mechanically moving a lens or a solid state deflector for electrically deflecting a light spot. The use of the solid state deflector is advantageous since it allows fast access and miniaturization. The solid state deflector may include a deflector using an acousto-optic effect, a deflector using an electro-optic effect or a deflector using surface acoustic waves. The solid state deflector can deflect a light spot over a range of 0.5 to 1 mm in a time not longer than 10 $\mu$s. For example, when the diameter of the cylindrically-shaped recording medium is 20 to 50 mm$\phi$ and the width of one information recording zone is 0.5 to 1 mm, the track pitch is in the order of 1 to 2 $\mu$m, a recording capacity per one track up to 4 to 20 KB is possible by pit edge recording, information of about 1 MB to 20 MB can be recorded in one information recording zone, and the information of 1 to 20 MB can be searched at a high speed in not longer than 10 $\mu$s. On the other hand, the speed of rotation of the cylindrically-shaped recording medium is in the order of 3600 to 10,000 rpm, and the data transfer rate is 0.24 to 3.3 MB/s. According to the present invention, information of about one megabyte (MB) to several-tens megabytes (MB) can be recorded in one information recording zone. Namely, one information recording zone corresponds to one floppy disk or one magnetic disk as conventionally used. Access to any track in the recording zone can be made by merely moving a light spot by means of the light spot moving means in a state in which the optical head itself is not moved or is fixed. Therefore, access faster than with a conventional magnetic memory is possible. The optical memory device has an excellent resistance against vibrations, and hence the device can operate stably even under a strongly vibrational condition as encountered in a portable computer or the like. Also, since the optical information recording medium is formed on a surface of the cylinder, the recording medium is free of any warp as encountered by a disk medium, and hence a focusing control of the light spot and the control of the position of the light spot relative to a track (or a tracking control) are easy, thereby making it readily possible to increase the speed of rotation up to 6,000 to 10,000 rpm and hence to increase the data transfer rate.

The optical memory device can be constructed so that the position of either of the optical head or the cylindrically-shaped information recording medium relative to the other in a direction parallel to the direction of a rotation axis of the recording medium is mechanically moved, thereby turning an information recording zone in the range of movement of the light spot by the light spot moving means into another information recording zone. Accordingly, a plurality of information recording zones can be provided on the cylindrically-shaped information recording medium. Since information of about one of megabyte to several-tens megabytes can be recorded in one information recording zone as mentioned above and several to several-tens of information recording zones can be provided, information of several megabytes to several-hundreds of megabytes can be recorded in or reproduced from one cylindrically-shaped recording medium. Any one of the information recording zones can be selected by a zone selecting mechanism. According to the present invention, the recording capacity can be increased by merely increasing the number of information recording zones to be provided on the cylindrically-shaped recording medium. In other words, a small-sized and large-capacity optical memory device can be provided without making the size of the device itself considerably or substantially large. For example, with a drum-like recording medium having a diameter of 30 mm and a height of 10 mm, there is readily obtained a microoptical memory device which has a very small size, not larger than 40 × 40 × 20 mm with the following performance: the recording capacity one of drum is 100 MB, the recording capacity per one information recording zone is 10 MB, the number of information recording zones is 10, the number of revolutions (or the speed of rotation) is 7,200 rpm, the data transfer rate is 1.2 MB/s, the mean access time is not longer than 1 ms, and the seek time is 10 $\mu$s.

Also, the optical memory device according to the present invention can be installed or incorporated as an optical memory package into an information processing apparatus such as a laptop computer or a portable computer. An information processing apparatus according to the present invention is constructed so that the above-mentioned optical memory device can be installed as a package. The information processing apparatus includes components necessary for driving and controlling the optical memory device, for example, a rotating mechanism for rotating the cylindrically-shaped information recording medium of the optical memory device, a moving mechanism (or zone selecting mechanism) for moving the optical head of the optical memory device, a signal processing circuit connected to the optical head for performing signal processing for the recording or reproduction of information and the positional control of a light spot including a focusing control and a tracking control, and a controller for driving and controlling the above-mentioned components.

DESCRIPTION OF THE PREFERRED EMBODIMENTS

Figure 1A:
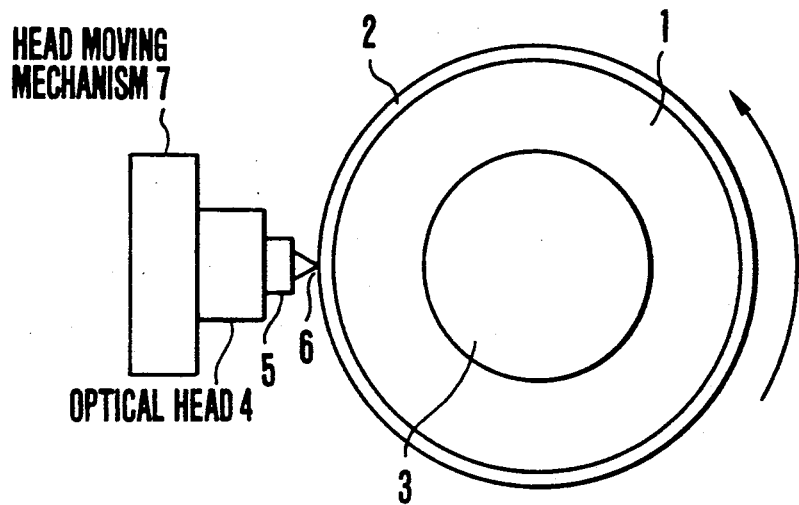
FIGS. 1a and 1b are plan and side views showing an embodiment of an optical memory device according to the present invention.
Figure 1B:
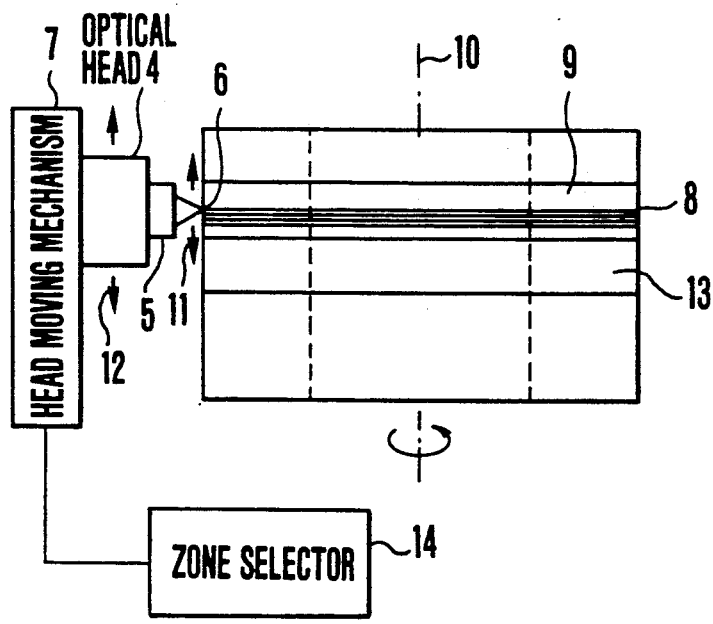

FIGS. 1a and 1b show in plan and side views an embodiment of an optical memory device according to the present invention. A cylindrically-shaped information recording medium 1 has an information recording film 2 provided on the surface of a cylindrical substrate and is rotated by a motor 3 in a direction indicated by the arrow. As required, the information recording medium 1 is provided with a transparent substrate having a guide track (groove or pre-pit train) formed thereon for guiding along a track a light spot with which the information recording film 2 is to be irradiated, and a protection film for protecting the information recording film 2 formed on the transparent substrate. The speed of rotation of the information recording medium 1 is usually 3,600 to 10,000 rpm but may be arbitrary. In order to increase the data transfer rate, the speed of rotation is preferably not less than 6,000 rpm. Since the recording medium is formed on the surface of the cylindrical substrate, the recording medium is free of any warp as may be involve in a disk medium. Therefore, positional control of the light spot is easy, and hence the speed of rotation of the recording medium can be easily increased. As the information recording film there can be used many kinds of recording films, including a write-once type recording film in which information can be written only once and a rewritable or erasable recording film in which information can be rewritten. Typical examples of the write-once type recording film include a Te-Se system chalcogen material, an organic dye material and a phase change material using a phase change between a crystalline state and an amorphous state. Typical examples of the rewritable or erasable recording film include an opto-magnetic recording material and a phase-change recording material. When the cylindrically-shaped information recording medium 1 is rotated, the recording or reproduction of information is achieved by means of an optical head 4. A lens 5 is provided at the tip of the optical head 4 and a small light spot 6 is formed on the information recording film 2 by means of the lens 5. The small light spot 6 with which the rotating information recording film 2 is irradiated can be moved in a direction parallel to a rotation axis 10 of the cylindrically-shaped information recording medium 1 or in a direction of arrow 11 with the optical head 4 itself not being moved. Thereby, the recording or reproduction of information along a desired track 8 on the information recording film 2 is effected while providing tracking control. A multiplicity of tracks 8 are formed in an area of an information recording zone 9. The small light spot 6 is arbitrarily moved in that area with no movement of the optical head 4 so that the recording or reproduction of information is effected in the information recording zone. In the recording zone 9, access to any track is made by merely moving the light spot by a light spot moving means incorporated into the optical head 4, with the optical head 4 itself being not moved or being fixed. Therefore, the width of the information recording zone is selected to fall within the range of movement of the light spot by the light spot moving means. If a solid state deflector is used as the light spot moving means, the deflection of the light spot in a range of 0.5 to 1 mm can be achieved at a high speed is not longer than 10 $\mu$s. When the diameter of the cylindrically-shaped information recording medium 1 is 20 to 50 mm$\phi$ and the width of one information recording zone 9 is 0.5 to 1 mm, information of about 1 MB to 20 MB can be recorded in one information recording zone and the information can be searched at a high speed in not longer than 10 $\mu$s. Namely, one information recording zone corresponds to one floppy disk or one magnetic disk as conventionally used, and access to any track 8 in the information recording zone can be achieved at a very high speed by merely moving the light spot by means of the light spot moving means, with the optical head 4 itself being not moved or being fixed. The optical head 4 can be moved in the direction of arrow 12 by an optical head moving mechanism 7. The amount of movement of the optical head 4 at that time is substantially equal to the range of movement of the light spot by the light spot moving means or greater than that. By thus making the large movement of the optical head 4 by use of the optical head moving mechanism 7, the information recording zone 9 in which the recording or reproduction of information is being made by only the movement of the small light spot can be changed to another zone 13. In this manner, a plurality of information recording zones can be provided on the cylindrically-shaped information recording medium 1. User information of about one megabyte to several-tens of megabytes can be recorded in one information recording zone. Since several to several-tens of information recording zones can be provided on the cylindrically-shaped information recording medium 1, it is possible to record or reproduce information of several megabytes to several-hundreds of megabytes in or from one cylindrically-shaped information recording medium. Also, any one of the information recording zones can be selected by driving and controlling the optical head moving mechanism 7 by means of a zone selector 14.

Figure 2:
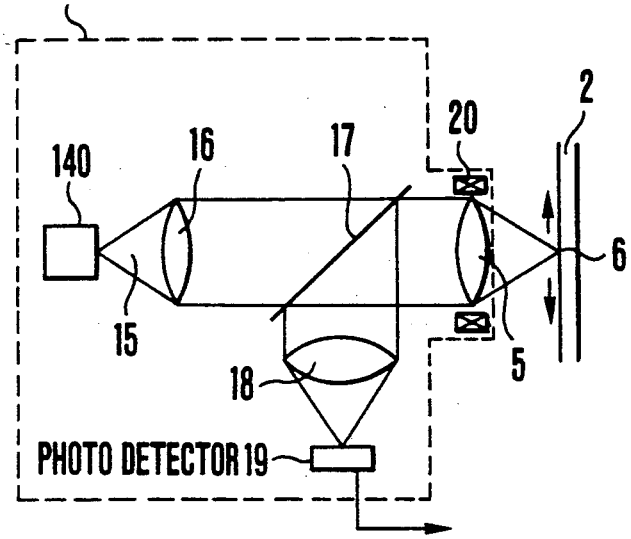
FIG. 2 is a view showing an embodiment of an optical head used in, the present invention.

FIG. 2 shows an embodiment of the optical head 4 used in the present invention. A laser beam 15 emitted from a semiconductor laser 140 is passed through a collimator lens 16 to provide a collimated beam which in turn is focused as a small light spot 6 on an information recording film 2 by a lens 5. A reflected beam from the information recording film is separated by a beam splitter 17 and is passed through a lens 18 and thereafter impinges upon a photo detector 19 which in turn detects a signal. The small light spot 6 moves in the direction of the arrow by mechanically moving the lens 5 by a lens driving mechanism 20. With such movement of the small light spot 6, the recording or reproduction of information in or from any track position in an information recording zone is effected while causing the small light spot 6 to follow a track.

Figure 3:
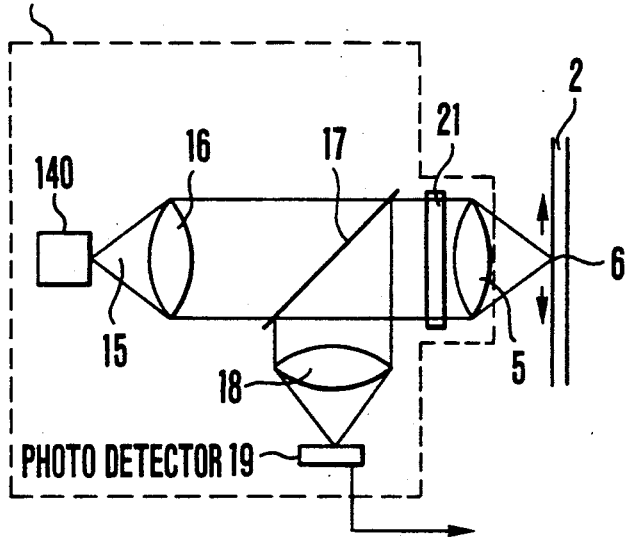
FIG. 3 is a view showing another embodiment of an optical head used, in the present invention.

FIG. 3 shows another embodiment of the optical head 4 used in the present invention. In a manner similar to the case of FIG. 2, a laser beam 15 emitted from a semiconductor laser 140 is introduced onto an information recording film 2 by a lens 5 so that a small light spot 6 is formed on the information recording film 2. The laser beam 15 is deflected by a solid state deflector 21 so that the small light spot 6 is moved on the information recording film 2 in the direction indicated by the arrow. The solid state deflector 21 may include a deflector using an acousto-optic effect, a deflector using an electro-optic effect, or the like. In the case where the solid state deflector using an acousto-optic effect is employed, the movement of the small light spot is effected by changing the frequency of acoustic waves in accordance with the desired amount of movement of the small light spot. In the case where the solid state deflector using an electro-optic effect is employed, the movement of the small light spot is effected by changing a voltage applied to the deflector. By using such solid state deflectors, it is possible to achieve the movement of the small light spot at a high speed.

Figure 4:
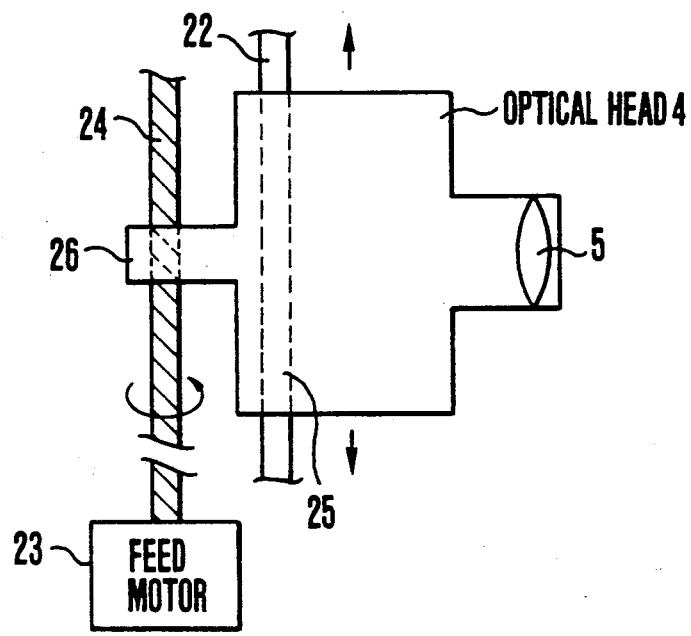
FIG. 4 is a view showing an embodiment of an optical head moving mechanism used in the present invention.

FIG. 4 shows an embodiment of the optical head moving mechanism 7 used in the present invention. An optical head 4 is supported by a feed guide shaft 22 inserted into a through-hole 25 of the optical head. A feed screw 24 inserted in a threaded feeder 26 is rotated by a feed motor 23 so that the optical head 4 is mechanically fed as a whole in the direction indicated by the arrow. The amount of feed of the optical head 4 is selected to be substantially equal to an information recording zone determined by the amount of movement of the small light spot or greater than that. In this manner, the turn-over of information recording zones into each other can be made. The moving mechanism 7 is not limited to the method using the feed screw but may be any known method using, for example, a linear motor or a wire. In the shown embodiment a structure has been employed in which the optical head 4 is moved. Alternatively, the cylindrically-shaped information recording medium 1 may be moved, with the optical head 4 being fixed.

Figure 5:
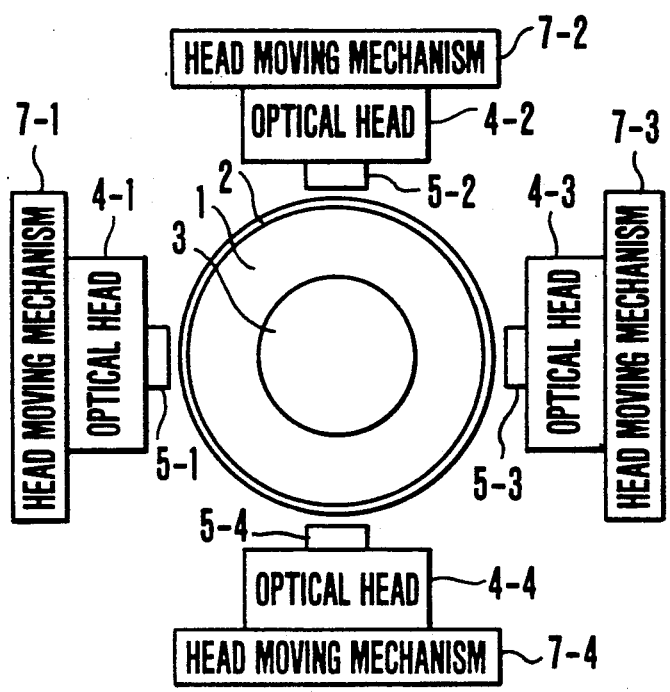
FIG. 5 is a view showing another embodiment of an optical memory device according to the present invention.

FIG. 5 shows another embodiment of an optical memory device according to the present invention, in which a plurality of optical heads are used. Four optical heads 4-1, 4-2, 4-3 and 4-4 are arranged around a cylindrically-shaped information recording medium 1 at positions where the cylinder is equally divided. These optical heads include lenses 5-1, 5-2, 5-3 and 5-4 and head moving mechanisms 7-1, 7-2, 7-3 and 7-4, respectively. The positions of the optical heads can be simultaneously or independently moved by the head moving mechanisms. In the case where the four optical heads are simultaneously moved, the optical heads are placed on the same information recording zone. The effect of the arrangement of the plurality of optical heads is demonstrated when access to specified information in the information recording zone upon recording or reproduction is to be made. Namely, in the case where access to specified information is to be made, there is usually a delay, including a time for positioning the small light spot onto a specified track where the specified information is to be recorded or is recorded and a time until a specified location on the track or circumference where the information is to be recorded or is recorded is reached through rotation. This delay is an access time. In the present embodiment, the delay time for positioning onto the specified track is very short since the small light spot is moved by the movement of the lens or by the solid state deflector, with the optical head itself being not moved, as has already been mentioned. The delay time for rotation is relatively long in the case where one optical head is used. However, in the case where a plurality of optical heads are used as in the present embodiment, the delay time for rotation can be shortened by the number of the optical heads. For example, when the speed of rotation of the cylindrically-shaped information recording medium 1 is 7,200 rpm, 8 ms is required for one rotation, and hence the mean delay time for rotation per one optical head in the case of the four-head arrangement is 1 ms. When the solid state deflector is used for movement of the small light spot, the delay time for positioning onto the specified track is usually not longer than 100 μs. Therefore, the total access time including the delay time for rotation is about 1 ms. Namely, much faster access as compared with the case of the conventional fixed magnetic disk is attainable. Various methods can be utilized for selecting any one of the four optical heads. One method includes positioning the four optical heads simultaneously onto the same track, reproducing a sector address from each optical head, and selecting the one of the four optical heads which is positioned in front of a target sector and nearest to the target sector.

Another advantage obtained by using the four optical heads is that the information recording or reproduction speed can be greatly enhanced by placing the four optical heads on different tracks respectively so that information is simultaneously and parallely recorded or reproduced.

Figure 6:
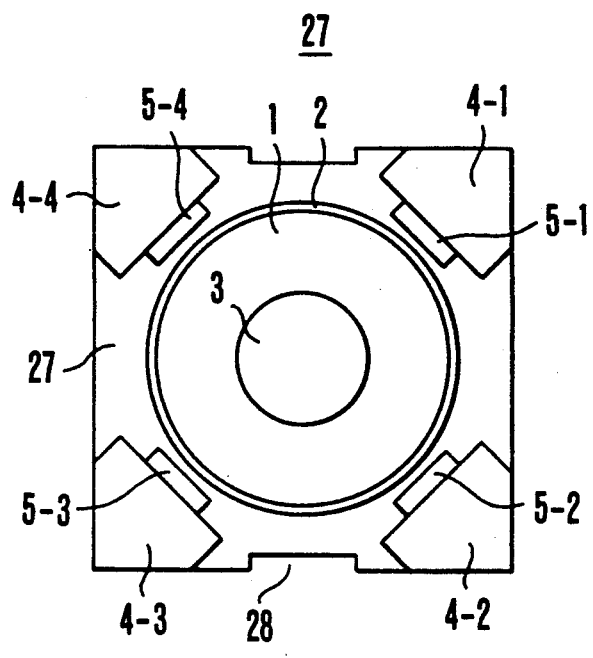
FIG. 6 is a view showing a further embodiment of an optical memory device according to the present invention.

FIG. 6 shows as a further embodiment of the present invention the structure of a small-sized optical memory package into which a cylindrically-shaped information recording medium and optical heads are incorporated. A small-sized optical memory package 27 includes a cylindrically-shaped information recording medium 1, an information recording film 2, a rotating motor 3, and optical heads 4-1, 4-2, 4-3 and 4-4. The four optical heads are mechanically fixed to each other so that the positions thereof relative to the cylindrically-shaped information recording medium can be simultaneously changed. For that purpose, a connection portion 28 for a moving mechanism is used. When the present package is installed into an information processing apparatus such as a portable computer, each head is connected through a contact to an information processing circuit in the information processing apparatus, and the connection portion 28 is connected to a moving mechanism preliminarily prepared in the information processing apparatus. It is not necessarily required that the rotating motor 3 be provided in the package 27. A motor preliminarily prepared in the information processing apparatus may be used. By thus preparing the information processing circuit and the moving mechanism, it is possible to make the optical memory package 27 very small. For example, when a drum-like recording medium having a diameter of 30 mm and a height of 10 mm is used, there is obtained an optical memory package which has a very small size, not larger than 40 × 40 × 20 mm, with the following performance: the recording capacity per one drum is 100 MB, the recording capacity per one information recording zone is 10 MB, the number of information recording zones is 10, the speed of rotation is 7,200 rpm, the data transfer rate is 1.2 MB/s, the means access time is not longer than 1 ms and the search time is 10 μs.

Figure 7:
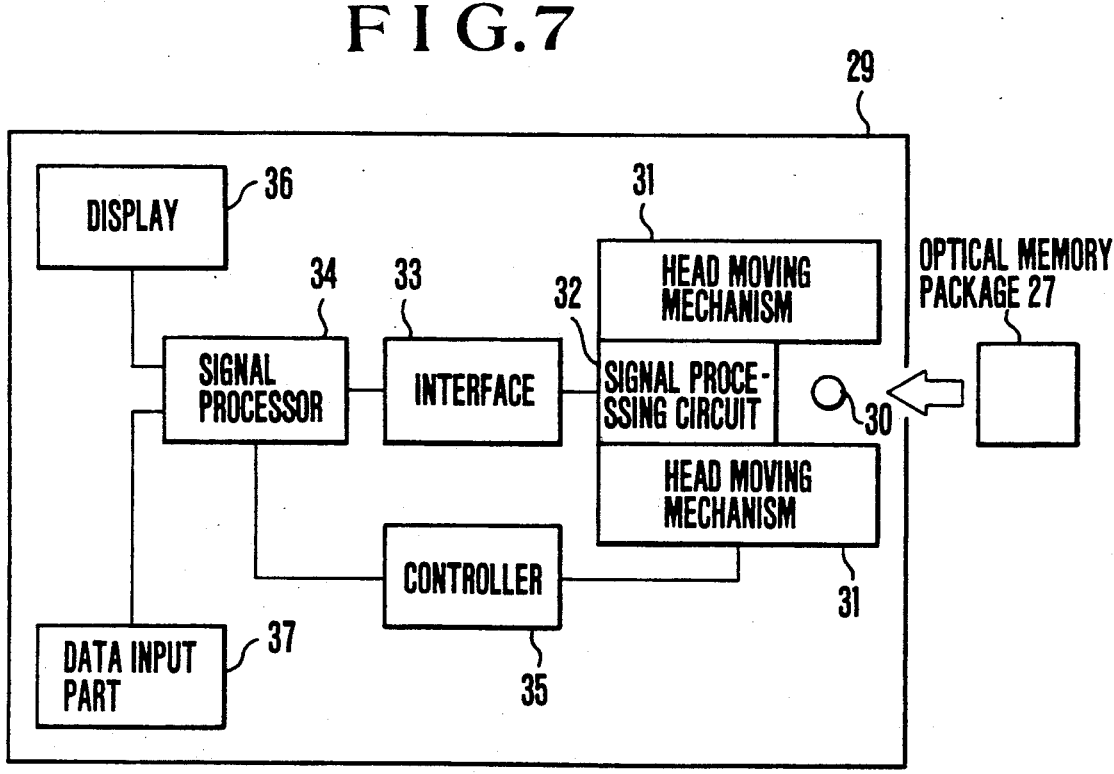
FIG. 7 is a view showing an embodiment of an information processing apparatus according to the present invention.

FIG. 7 shows as a still further embodiment of the present invention the construction of an information processing apparatus into which the above-mentioned small-sized optical memory package 27 is adapted to be installed. An information processing apparatus 29 includes therein a motor 30 for rotating a cylindrically-shaped information recording medium of the small-sized optical memory package 27 to be installed, a moving mechanism 31 for moving an optical head of the optical memory package, a signal processing circuit 32 connected to the optical head for performing signal processing, a signal processor 34, an interface 33 for connecting the signal processor 34 and the signal processing circuit 32 with each other, a controller 35 for driving the small-sized optical memory package 27 by a signal from the signal processor 34, a display 36 connected to the signal processor 34, and a data input part 37 such as a keyboard, etc. The very small-sized optical memory package 27 installed into the information processing apparatus 29 is used as a medium-exchangeable or fixed external memory.

As has been mentioned above, the use of a small-sized optical memory device, a small-sized optical memory package and an information processing apparatus according to the present invention provides a very small-sized and large-capacity memory device which has a much faster access speed than the conventional fixed magnetic disk, floppy disk and optical disk. Also, the recording and reproduction of information are achieved optically, it is possible to make the distance between the optical head and the information recording medium large, thereby providing a high-reliability external file memory which can provide very stable operation even under a strongly vibrational condition as encountered in a portable computer or the like.

What is claimed is:

1. An optical memory device comprising:
    an information recording medium having a cylindrical surface with a recording film thereon on or from which information can be recorded or reproduced along a track extending in the circumferential direction thereof, said information recording medium being adapted for rotation about the longitudinal axis of said cylindrical surface;
    an optical head disposed around said information recording medium for irradiating said information recording medium with a light spot as said information recording medium is rotating, said optical head including light spot generating means for generating a light spot, and light spot moving means for moving the light spot in a direction substantially parallel to said longitudinal axis, while maintaining the positions of said optical head and said information recording medium relative to each other in the direction parallel to said longitudinal axis, information being recorded or reproduced while causing the light spot to follow the track within a range of movement of the light spot by said light spot moving means, the area within said range of movement of the light spot by said light spot moving means being defined as one information recording zone of said information recording medium, said information recording medium including a plurality of said information recording zones; and
    a moving mechanism for changing the position of one of said optical head and said information recording medium relative to the other thereof to permit changing of the light spot from irradiating a first one of said information recording zones to irradiating another one of said information recording zones.

2. An optical memory device according to claim 1, wherein said light spot moving means includes a solid state deflector.

3. An optical memory device according to claim 1, having a plurality of said optical heads disposed at positions equally dividing the periphery of said information recording medium.

4. An optical memory device according to claim 1, wherein each information recording zone has a recording capacity of form about one megabyte to several-tens of megabytes.

5. An information processing apparatus comprising:
    an optical memory device including an information recording medium having a cylindrical surface with a recording film thereon, on from which information can be recorded or reproduced along a track extending in the circumferential direction thereof, said information recording medium being adapted for rotation about the longitudinal axis of said cylindrical surface; and optical head disposed around said information recording medium for irradiating said information recording medium with a light spot as said information recording medium is rotating, said optical head including light spot generating means for generating a light spot, and light spot moving means for moving the light spot in a direction substantially parallel to said longitudinal axis, while maintaining the positions of said optical head and said information recording medium relative to each other in the direction parallel to said longitudinal axis, information being recorded or reproduced while causing the light spot to follow the track within a range of movement of the light spot by said light spot moving means, the area within said range of movement of the light spot by said light spot moving means being defined as one information recording zone of said information recording medium, said information recording medium including a plurality of said information recording zones; and a moving mechanism for changing the position of one of said optical head and said information recording medium relative to the other thereof to permit changing of the light spot from irradiating a first one of said information recording zones to irradiating another one of said information recording zones; and housing means housing said optical memory device and including a rotating mechanism for rotating said information recording medium; a moving mechanism for moving said optical head; a signal processing circuit connected to said optical head for performing signal processing for the recording or reproduction of information and positional control of the light spot; and a controller for controlling said rotating mechanism, said moving mechanism and said signal processing circuit.

6. An information processing apparatus according to claim 5, wherein said light spot moving means includes a solid state deflector.

7. An information processing apparatus according to claim 5, having a plurality of said optical heads disposed at positions equally dividing the periphery of said information recording medium.

8. An information processing apparatus according to claim 5, wherein each information recording zone has a recording capacity of form about one megabyte to several-tens of megabytes.

9. An optical memory device comprising a cylindrical information recording medium for recording information thereon and adapted for rotation about the longitudinal axis thereof; an optical had disposed around said information recording medium for focusing a light spot onto said information recording medium to for recording or reproduction of information along a track on said recording medium, including light spot generating means for generating a light spot, and light spot moving means for moving the light spot in a direction substantially perpendicular to the direction of the track with said optical head not being moved, the recording or reproduction of information being achieved by causing said light spot moving means to perform tracking control so that the light spot follows the track in an area within a range of movement of the light spot by said light spot moving means; and moving means for changing the position of one of said optical head and said cylindrically-shaped information recording medium relative to the other thereof in a direction parallel to the direction of the rotation axis of said cylindrically-shaped information recording medium.

10. An optical memory device according to claim 9, wherein said moving means is capable of changing the position of said one of said optical head and said cylindrically-shaped information recording medium relative to the other by an amount not greater than the amount of movement of the light spot by said light spot moving means.

11. An optical memory device according to claim 9, wherein the area within the range of movement of the light spot by said light spot moving means is defined as one information recording zone of said cylindrically-shaped information recording medium said information recording zone being substantially concentric with said cylindrically-shaped information recording medium.

12. An optical memory device according to claim 11, wherein said cylindrically-shaped information recording medium includes a plurality of information recording zones.

13. An optical memory device according to claim 12, further comprising selecting means for selecting one of said information recording zones for recording or reproduction of information.

14. An optical memory device according to claim 9, wherein said light spot moving means comprises means for mechanically moving the light spot.

15. An optical memory device according to claim 9, wherein said light spot moving means comprises an acousto-optic element.

16. An optical memory device according to claim 9, wherein said moving means comprises means for moving said optical head.

17. An optical memory device according to claim 9, having a plurality of said optical heads disposed at positions equally dividing the periphery of said cylindrically-shaped information recording medium.

18. An optical memory device according to claim 9, wherein said cylindrically-shaped information recording medium comprises an opto-magnetic recording medium.

19. An optical memory device according to claim 9, wherein said cylindrically-shaped information recording medium comprises a phase-change recording material.

20. An optical memory device according to claim 9, further comprising an information processing apparatus with said optical head installed therein and having a rotating mechanism for rotating said cylindrically-shaped information recording medium.

21. An optical memory device comprising:
a rotating cylindrically-shaped information recording medium having a plurality of recording tracks provided thereon and extending in the circumferential direction thereof, with a plurality of multi-track zones formed on said information recording medium by dividing said information recording medium in the direction parallel to the direction of the rotational axis thereof;
an optical head for irradiating said rotating information recording medium with a light spot;
optical head moving means for moving said optical head in the direction parallel tot he direction of the rotational axis of said information recording medium; and
light spot moving means in said optical head for moving said light spot between the tracks within one zone.

* * * * *